United States Patent [19]

Fields et al.

[11] 4,026,004
[45] May 31, 1977

[54] METHOD OF FORMING REFRIGERATOR LINER AND SHELF SUPPORTS

[75] Inventors: Robert Edward Fields; Charles Walter Haag; Robert Edward Lindenschmidt, all of Evansville, Ind.

[73] Assignee: Whirlpool Corporation, Benton Harbor, Mich.

[22] Filed: Dec. 4, 1975

[21] Appl. No.: 637,577

[52] U.S. Cl. .................. 29/458; 220/9 F; 312/214

[51] Int. Cl.² ............. B23P 3/00; B23P 25/00

[58] Field of Search ............ 29/445, 458; 113/120 HA; 248/239; 312/214, 245, 350; 220/9 F

[56] References Cited

UNITED STATES PATENTS

| | | | |
|---|---|---|---|
| 2,028,943 | 1/1936 | Money | 113/120 HA |
| 2,423,863 | 7/1947 | Wales | 113/120 HA |
| 3,091,946 | 6/1963 | Kesling | 220/9 F X |
| 3,294,462 | 12/1966 | Kesling | 220/9 F X |
| 3,441,331 | 4/1969 | Kesling | 312/350 X |
| 3,470,598 | 10/1969 | Berthelsen | 29/458 X |
| 3,535,144 | 10/1970 | Gunderman et al. | 220/9 F X |
| 3,913,996 | 10/1975 | Benford | 220/9 F X |
| 3,921,279 | 11/1975 | Daley | 29/458 |

Primary Examiner—Charlie T. Moon
Attorney, Agent, or Firm—Wegner, Stellman, McCord, Wiles & Wood

[57] ABSTRACT

A method of forming an insulated cabinet wall structure wherein a body of insulation is foamed in situ against an outer face of a liner sheet strip to define a laminate. A plurality of holes are formed in the laminate extending through the liner and into the insulation, and a plurality of supports are installed on the laminate by insertion of a mounting portion thereof in the mounting holes. The laminate with the supports secured thereto is subsequently formed into a preselected cabinet configuration to define a chamber with the supports projecting inwardly from the liner into the chamber. This structure may then be inserted into a formed outer cabinet.

14 Claims, 4 Drawing Figures

U.S. Patent May 31, 1977 4,026,004
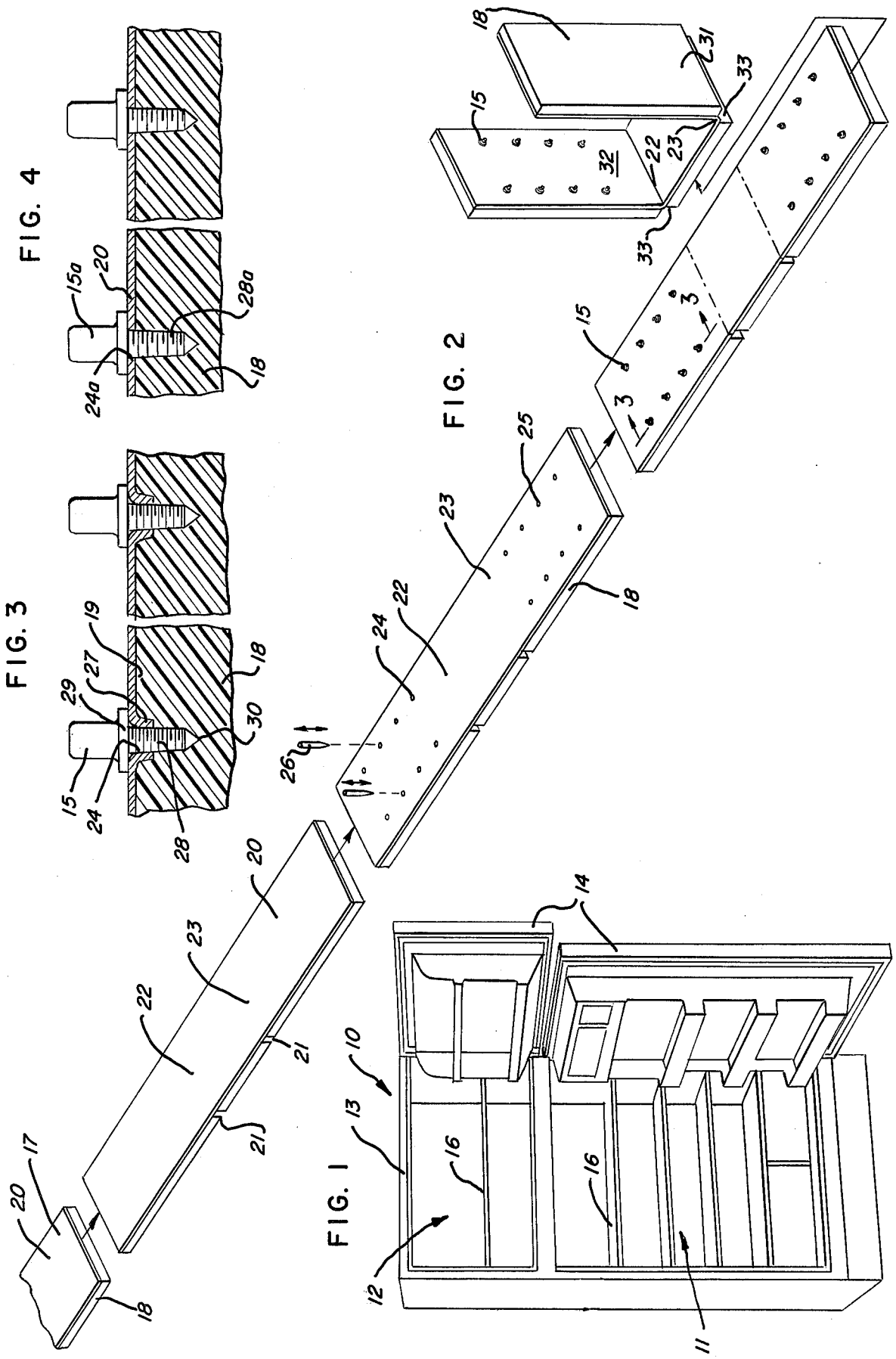

METHOD OF FORMING REFRIGERATOR LINER AND SHELF SUPPORTS

BACKGROUND OF THE INVENTION

1. Field of the Invention

This invention relates to insulated cabinet construction and in particular to cabinet construction utilizing a liner and foam insulation laminate which is initially a substantially continuous strip.

2. Description of the Prior Art

One improved form of refrigeration apparatus cabinet is defined by an inner liner and an outer shell having foamed insulation foamed in place therebetween. Conventionally in such cabinet structures, shelf supports are provided on the liner and one common form of such shelf support comprises posts extending through openings in the liner.

The foaming-in-place of the insulation is relatively expensive and requires expensive jigs and supports for accurately spacing the liner relative to the shell in the desired cabinet-forming configuration during the foaming operation. Recently, an improved method of forming such a liner-insulation-shell cabinet construction has been developed wherein the insulation is foamed onto a sheet strip of liner material in a continuous process. The resulting laminate of liner and insulation materials is cut to discrete lengths and subsequently formed into a desired inner wall configuration to be inserted in the outer shell in forming the final cabinet construction.

In U.S. Pat. No. 2,028,943 of Roland H. Money, a method of forming a refrigerator lining is illustrated having integrally formed shelf supporting ledges formed in a liner sheet prior to the forming of the sheet into the cabinet wall configuration.

Herbert E. Mills et al, in U.S. Pat. No. 2,342,956, show a similar cabinet arrangement wherein ribs are formed in the sidewalls.

In U.S. Pat. No. 2,423,863 of George F. Wales, a sheet metal compartment is provided with integral shelf support ribs.

Leo G. Beckett, in U.S. Pat. No. 2,620,254, shows an adjustable shelf construction for refrigerator cabinets having studs installed in the liner to extend into the foamed insulation.

In U.S. Pat. No. 2,657,894, Lester J. Sklenar shows a drive fastener support defined by a drive pin stud having a shank portion extending through the liner wall.

The technique of folding a liner-insulation laminate into an interior wall and insulation structure is disclosed in U.S. Pat. No. 3,910,658 of Robert Lindenschmidt, assigned to the assignee of the present application.

SUMMARY OF THE INVENTION

The present invention comprehends an improved method of forming an insulated refrigeration cabinet wall structure having an inner liner, an outer insulation, and a plurality of inwardly projecting supports, comprising the steps of forming a body of insulation in situ against an outer face of a liner sheet strip to define a laminate, passing a plurality of hole-forming tools outwardly through the liner and into the insulation to form a plurality of mounting holes at preselected positions in the laminate, installing a plurality of supports in the laminate by inserting a mounting portion of the supports in the mounting holes, and forming the laminate into a preselected cabinet configuration defining an inner chamber with the supports projecting inwardly from the liner into the chamber. The formed laminate may then be installed in a preformed outer cabinet shell.

The liner sheet strip is preferably substantially flat prior to the step of forming the laminate into the cabinet construction. The support holes may be formed as by punching, piercing, drilling, or the like, with the foam insulation serving as a backup support during the hole-forming operation without the need for additional support means.

The laminate may be formed to the desired cabinet configuration by folding the liner at preselected portions with the insulation adjacent thereto being separated so as to form voids outwardly of the folded liner corners. The separation may be effected by notching the insulation prior to the step of forming the laminate into the cabinet configuration.

In the illustrated embodiment, the cabinet configuration comprises a U-shaped configuration with the laminate defining the inner bottom and side wall portions of the cabinet construction.

The liner may be formed of a suitable material, such as metal or synthetic resin.

Thus, the method of forming an insulated cabinet wall structure of the present invention is extremely simple and economical while yet providing an improved cabinet wall structure.

BRIEF DESCRIPTION OF THE DRAWING

Other features and advantages of the invention will be apparent from the following description taken in connection with the accompanying drawing wherein:

FIG. 1 is a perspective view of a refrigeration apparatus having a cabinet wall structure formed by a method embodying the invention;

FIG. 2 is a fragmentary perspective view illustrating the method of forming the cabinet wall structure;

FIG. 3 is a fragmentary enlarged vertical section taken substantially along the line 3—3 of FIG. 2; and FIG. 4 is a view similar to that of FIG. 3 but illustrating a modified form of shelf support and method of attachment.

DESCRIPTION OF THE PREFERRED EMBODIMENT

In the exemplary embodiment of the invention as disclosed in FIGS. 1–3 of the drawing, a refrigeration appliance generally designated 10 illustratively comprises a combination refrigerator-freezer apparatus having a lower refrigeration portion 11 and an upper freezer portion 12 defined by a cabinet 13 provided with suitable doors 14. The present invention is directed to an improved method of forming the cabinet wall structure including the provision of a plurality of shelf supports 15 for supporting a plurality of shelves 16 in the cabinet wall structure.

As best seen in FIG. 2, the method of the present invention comprehends forming a laminate 17 by foaming-in-place a body of foam insulation 18 against an outer surface 19 of a liner sheet strip 20 which may be provided in substantially continuous form. The liner may comprise a strip of suitable sheet metal or synthetic resin, as desired. The insulation may comprise foamed-in-place urethane resin or the like. The continuous laminate may be cut to preselected lenghts. The laminate may be provided with suitable notches 21 at preselected positions corresponding to portions 22 and 23 of the liner to be subsequently folded in forming the final cabinet configuration.

The laminate section may next be provided with a plurality of holes 24 rearwardly of portion 22 and a plurality of holes 25 forwardly of portion 23. The holes may be formed by suitable piercing, punching, drilling, etc., forming operations with the insulation 18 forming a substantially rigid backup support for the liner during the hole-forming operation. In the illustrated embodiment, the hole-forming tools 26 comprise punching tools deforming the liner to define an outwardly turned annular wall 27. As shown in FIG. 3, the holes may extend outwardly into the insulation.

Shelf supports 15 may next be mounted to the laminate with a shank portion 28 thereof extending through the annular flange wall 27 into the insulation, as illustrated in FIG. 3. The supports may include a collar 29 for limiting the insertion whereby the tip 30 of the support is spaced inwardly of the outer surface 31 of insulation 18.

Upon installation of the supports in the laminate, the laminate may be formed into a preselected cabinet configuration, such as the U-shaped configuration shown in FIG. 2 wherein the laminate defines a chamber 32 with the supports 15 projecting inwardly into the chamber.

Notches 21 permit the insulation to be separated outwardly of liner portions 22 and 23 to form voids 33 at the corners of the U-shaped configuration shown in FIG. 2. In installing the U-shaped configuration in the outer cabinet 13, voids 33 may be filled with suitable insulation as desired.

In the embodiment of FIG. 4, the support mounting holes comprise drilled holes with the tool 26 comprising a suitable drill for providing an opening in the liner free of the inturned flange wall 27 of the embodiment of FIG. 3, and permitting the support 15a to have a threaded shank portion 28a threaded through the liner opening 24a and into the insulation.

If desired, a support 15a having a threaded shank portion 28a can be used where the holes 24 are pierced, leaving an inturned flange wall as indicated at 27 in FIG. 3. In addition, where the holes 24 are either drilled or punched such that no inturned flange wall is created, a support 15 having an expandable shank (not shown) can be employed. The shank of such a support expands against the surface 19 of liner 20 to hold the support in place. Such supports are well-known and take a wide variety of shapes.

Thus, the cabinet construction of the present invention is extremely simple and economical. The forming of the laminate as a continuous flat strip permits facilitated accurate control of the density and thickness of the insulation. By providing the laminate in the desired cut lengths from the laminate forming operation, the hole forming and support mounting steps may be conveniently effected with the laminate maintained in the flat arrangement. By forming the support mounting holes after the insulation is foamed against the liner to form the laminate, taping or other forms of plugging of the mounting holes required before foaming insulation in prior art cabinet forming methods is eliminated, further reducing the cost of the cabinet construction.

Where the support holes are pierced through the liner, the flange 27 provides improved mounting of the support and permits the shank portion 28 to define a conventional drive pin structure which may be readily pushed home in the mounting operation.

The notching operation may comprise a simple slitting operation or a cutting operation.

The foregoing disclosure of specific embodiments is illustrative of the broad inventive concepts comprehended by the invention.

Having described the invention, the embodiments of the invention in which an exclusive property or privilege is claimed are defined as follows:

1. The method of forming an insulated cabinet wall structure having an inner liner, an outer insulation, and a plurality of inwardly projecting supports, comprising the steps of:
   forming a body of insulation in situ against an outer face of a liner sheet strip to define a laminate;
   passing a plurality of hole-forming tools outwardly through the liner and into the insulation to form a plurality of mounting holes at preselected positions in the laminate;
   installing a plurality of supports in said laminate by inserting a mounting portion of said supports in said mounting holes; and
   forming the laminate into a preselected cabinet configuration defining an inner chamber with said supports projecting inwardly from the liner into said chamber.

2. The method of forming an insulated cabinet wall structure of claim 1 wherein said liner sheet strip is substantially flat prior to said step of forming the laminate into said cabinet configuration.

3. The method of forming an insulated cabinet wall structure of claim 1 wherein said tools comprise punches.

4. The method of forming an insulated cabinet wall structure of claim 1 wherein said tools comprise drills.

5. The method of forming an insulated cabinet wall structure of claim 1 wherein said tools comprise piercing tools.

6. The method of forming an insulated cabinet wall structure of claim 1 wherein the foam insulation comprises the liner supporting means during the hole-forming step.

7. The method of forming an insulated cabinet wall structure of claim 1 wherein the foam insulation defines effectively rigid backup means for supporting the liner during the passing of the hole-forming tool therethrough.

8. The method of forming an insulated cabinet wall structure of claim 1 wherein the foamed insulation of the laminate is notched at preselected portions prior to the forming of the laminate into said cabinet configuration, the liner being folded adjacent the notched insulation portions in the cabinet configuration forming operation.

9. The method of forming an insulated cabinet wall structure having an inner liner, an outer insulation, a plurality of inwardly projecting supports, and an outer cabinet, comprising the steps of:
   foaming a body of insulation in situ against an outer face of a liner sheet strip to define a laminate;
   passing a plurality of hole-forming tools outwardly through the liner and into the insulation to form a plurality of mounting holes at preselected positions in the laminate;
   installing a plurality of supports on said laminate by inserting a mounting portion of said supports in said mounting holes;

forming the laminate into a preselected cabinet configuration defining an inner chamber with said supports projecting inwardly from the liner into said chamber; and fitting the cabinet configuration laminate into the outer cabinet.

10. The method of forming an insulated cabinet wall structure of claim 9 wherein said laminate is formed into a U-shaped configuration.

11. The method of forming an insulated cabinet wall structure of claim 9 wherein said cabinet structure defines a refrigeration apparatus cabinet including shelves removably resting on said inwardly projecting supports.

12. The method of forming an insulated cabinet wall structure of claim 9 wherein said laminate is initially substantially continuous, and is cut to a predetermined length prior to the step of forming said laminate into a cabinet configuration.

13. The method of forming an insulated cabinet wall structure of claim 9 wherein the mounting portions of the supports are spaced inwardly of the outer cabinet.

14. The method of forming an insulated cabinet wall structure of claim 9 wherein said liner is formed of metal.

* * * * *